United States Patent [19]
Herzhoff et al.

[11] 3,726,628
[45] Apr. 10, 1973

[54] EXTRUDER FOR THE PRODUCTION OF FOILS

[75] Inventors: Peter Herzhoff, Leverkusen; Hans Gref, Cologne; Wolfgang Schweicher, Leverkusen, all of Germany

[73] Assignee: Agfa-Gevaert Aktiengesellschaft, Leverkusen, Germany

[22] Filed: Apr. 28, 1971

[21] Appl. No.: 138,107

[30] Foreign Application Priority Data

May 8, 1970 Germany.....................P 20 22 415.1

[52] U.S. Cl. ................425/461, 425/192, 425/472, 425/466
[51] Int. Cl. ...............................................B29f 3/04
[58] Field of Search....................425/381, 466, 224, 425/376, 192, 461, 462, 463, 472; 164/343, 137, 81

[56] References Cited

UNITED STATES PATENTS

| | | | |
|---|---|---|---|
| 3,600,750 | 1/1971 | Stroszynski | 425/376 |
| 3,039,143 | 6/1962 | Nicholson | 425/466 |
| 3,122,789 | 3/1964 | Coffee | 425/466 |
| 3,528,485 | 9/1970 | Vogel | 164/343 X |

Primary Examiner—J. Spencer Overholser
Assistant Examiner—Michael O. Sutton
Attorney—Connolly & Hutz

[57] ABSTRACT

For adjusting the slit width of an extruder for the production of foils or webs, the extruder body is enclosed in a housing defining a compensation chamber, sealed by an elastic packing which extends around the mouth of the extruder slit, and a constant pressure difference being maintained between the compensation chamber and the distributor chamber of the extruder body.

4 Claims, 1 Drawing Figure

PATENTED APR 10 1973  3,726,628
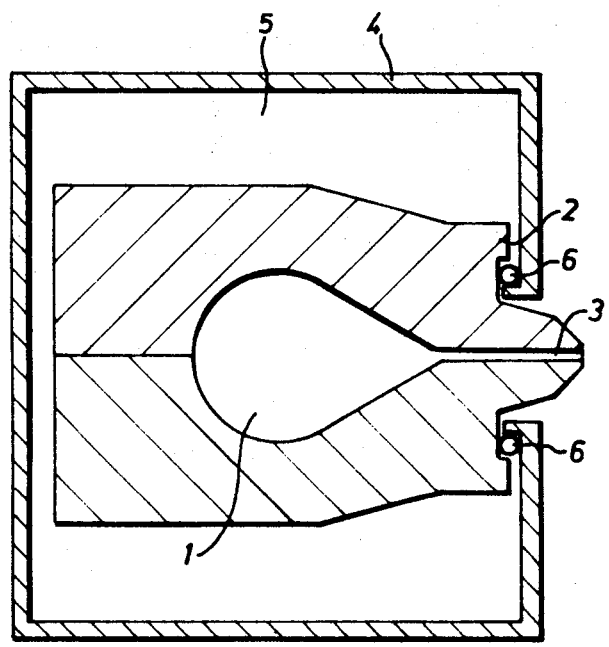
INVENTORS:
PETER HERZHOFF,  HANS GREF,  WOLFGANG SCHWEICHER.
BY Connolly and Hutz

EXTRUDER FOR THE PRODUCTION OF FOILS

The invention relates to extruders for the production of foils, for example photographic films, or for the coating of supports, for example with photographic emulsions.

The viscous solution to be extruded is formed into a wide, very thin web, the thickness of which often has to be controlled to a high standard of accuracy. The solution is forced from a distributor chamber, which is under super-atmospheric pressure, through a layer-forming slit. The slit has to be made very carefully to comply with the standards of accuracy required as any deviation from the nominal slit width is shown as thickness errors in the extruded web. The web thickness is approximately proportional to the third power of the slit width. Since the distributor chamber is under internal super-atmospheric pressure, elastic deformations of the cast body and thus of the sensitive layer-forming or coating-forming slit can occur. The casting units are therefore generally provided with complicated adjustment mechanisms, for example, pressure and tension screws, with the aid of which the slit of the casting unit is adjusted to the nominal slit width. This operation usually requires considerable care. However, the adjustment only remains correct for a quite specific pressure in the distributor chamber. If this pressure is changed, for example by an alteration in the extrusion speed or an alteration in the viscosity of the material to be extruded, the adjustment has to be carried out again.

According to the present invention, there is provided an extruder with an adjustable slit width for the production of foils or webs wherein the extruder slit protrudes from a housing enclosing and moveably supporting the extruder body, the housing defining a closed compensation chamber sealed by an elastic packing which extends around the mouth of the extruder slit, a constant pressure difference being maintained between the compensation chamber and the distributor chamber of the extruder body.

In accordance with one preferred embodiment, this pressure difference has the value zero. The same pressure then obtains in the compensation chamber and in the distributor chamber of the extruder body. It is obvious that it is not necessary to exactly maintain the equality of the pressures, providing they are substantially equal.

The compensation chamber is preferably filled with a pressure medium of gas or liquid.

In this way, the effect is obtained that the extruder body is always in force equilibrium, so that deformations are avoided. One construction example of the invention is shown in the accompanying drawing and will hereinafter be more fully described.

The casting solution is introduced into the distributor chamber 1 of the casting body 2, which consists of two component parts of symmetrical form, and is extruded through the slit 3. The casting body is suspended so to be freely moveable in the jacket or housing 4. Only the mouth of the extruder slit 3 projects from the housing. The jacket chamber 5 between the casting body 2 and the housing 4 is filled with a liquid or gas and is sealed by an elastic packing 6 extending around the mouth of the slit 3. The pressure of the liquid or gas in the chamber 5 is always maintained equal to the pressure in the distributor chamber 1.

What we claim is:

1. An extruder for the production of foils or webs comprising an extruder body, a mouth portion on the extruder body, a slit on the mouth portion, a housing enclosing and movably supporting the extruder body with the slit disposed to protrude outside of the housing, the housing defining a closed compensation chamber sealed by an elastic packing seal which extends around and is disposed in sealing contact with the mouth portion of the extruder body, and a fluid pressure means in the compensating chamber for maintaining a fluid pressure in the compensation chamber substantially equal to the pressure in the extruder body whereby the dimensions of the slit are maintained substantially constant.

2. An extruder as set forth in claim 1 wherein the fluid pressure means in the compensation chamber is a gas.

3. An extruder as set forth in claim 1 wherein the fluid pressure means in the compensation chamber is a liquid.

4. An extruder as set forth in claim 1 wherein the elastic packing seal comprises an O-ring seal.

* * * * *